(12) United States Patent
Flick

(10) Patent No.: US 11,447,097 B1
(45) Date of Patent: Sep. 20, 2022

(54) CONTROL SYSTEM WITH WIRELESS CONTROL DEVICE AUTHORIZATION AND RELATED METHODS

(71) Applicant: OMEGA PATENTS, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 0 days.

(21) Appl. No.: 17/446,655

(22) Filed: Sep. 1, 2021

(51) Int. Cl.
| | | |
|---|---|---|
| *B60R 25/24* | (2013.01) | |
| *B60R 16/023* | (2006.01) | |
| *B60R 25/20* | (2013.01) | |
| *G08C 17/02* | (2006.01) | |
| *G07C 5/00* | (2006.01) | |
| *H04M 1/72* | (2021.01) | |

(52) U.S. Cl.
CPC .......... *B60R 25/24* (2013.01); *B60R 16/0231* (2013.01); *B60R 25/209* (2013.01); *G07C 5/008* (2013.01); *G08C 17/02* (2013.01); *B60R 2325/205* (2013.01); *G08C 2201/91* (2013.01); *H04M 1/72* (2013.01)

(58) Field of Classification Search
CPC ..... B60R 25/24; B60R 25/10; H04L 63/0853; H04L 67/02; H04L 63/0861; G06F 3/165; G06F 17/00; G06F 21/305; H04W 4/40; B60L 53/14; H04M 1/66; G06Q 10/02
See application file for complete search history.

(56) References Cited

U.S. PATENT DOCUMENTS

| | | | |
|---|---|---|---|
| 4,383,242 A | 5/1983 | Sassover et al. | |
| 5,146,215 A | 9/1992 | Drori | |
| 5,252,966 A | 10/1993 | Lambropoulos et al. | |
| 5,654,688 A | 8/1997 | Allen et al. | |
| 5,719,551 A | 2/1998 | Flick | |
| 5,986,571 A | 11/1999 | Flick | |
| 6,130,606 A | 10/2000 | Flick | |
| 6,140,938 A | 10/2000 | Flick | |
| 6,140,939 A | 10/2000 | Flick | |
| 6,144,315 A | 11/2000 | Flick | |
| 6,188,326 B1 | 2/2001 | Flick | |
| 6,320,514 B1 | 11/2001 | Flick | |
| 6,480,117 B1 | 11/2002 | Flick | |
| 6,509,868 B2 | 1/2003 | Flick | |

(Continued)

*Primary Examiner* — Yuri Kan
(74) *Attorney, Agent, or Firm* — Allen, Dyer, Doppelt + Gilchrist, P.A.

(57) ABSTRACT

A control system is for a vehicle with vehicle devices and a data communications bus extending through the vehicle and coupled to the vehicle devices. The control system may include a vehicle wireless device, and a vehicle controller configured to communicate, via the data communications bus, with a vehicle device based upon an authorized wireless control device, and send a request for authorization, via the vehicle wireless device, of a new wireless control device to be able to operate the vehicle controller. The control system may include a remote wireless device away from the vehicle and configured to receive the request for authorization from the vehicle controller, present the request for authorization to a user, and permit the user to send a response to the request for authorization to the vehicle controller.

33 Claims, 6 Drawing Sheets

(56) References Cited

U.S. PATENT DOCUMENTS

| | | | |
|---|---|---|---|
| 6,771,188 B2 | 8/2004 | Flick | |
| 7,305,293 B2 | 12/2007 | Flick | |
| 8,032,278 B2 | 10/2011 | Flick | |
| 9,641,521 B2* | 5/2017 | Egan | H04L 63/0853 |
| 10,049,563 B2 | 8/2018 | Flick | |
| 10,328,897 B1* | 6/2019 | Nabbe | G06F 21/305 |
| 2004/0054561 A1* | 3/2004 | Ogura | G06Q 10/02 |
| | | | 705/5 |
| 2013/0110321 A1* | 5/2013 | Van Wiemeersch | G06F 17/00 |
| | | | 701/2 |
| 2014/0162598 A1* | 6/2014 | Villa-Real | H04M 1/66 |
| | | | 455/411 |
| 2014/0167985 A1* | 6/2014 | Halnais | B60L 53/14 |
| | | | 340/901 |
| 2015/0363986 A1* | 12/2015 | Hoyos | H04W 4/40 |
| | | | 340/5.61 |
| 2017/0187863 A1* | 6/2017 | Chen | H04L 67/02 |
| 2019/0287323 A1* | 9/2019 | Ramie | G06F 3/165 |

\* cited by examiner

CONTROL SYSTEM WITH WIRELESS CONTROL DEVICE AUTHORIZATION AND RELATED METHODS

TECHNICAL FIELD

The present disclosure is related to the field of vehicle control systems, and, more particularly to a security system for a vehicle and related methods.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Significant advances were disclosed in U.S. Pat. No. 10,049,563 to Flick. Flick '563 discloses a remote control system for a vehicle of a type including a data communications bus extending throughout the vehicle. The system may include a remote transmitter, a multi-adaptor vehicle remote function controller being responsive to the remote transmitter, and a data bus adaptor for adapting the multi-adaptor vehicle remote function controller to communicate via the data communications bus. The data bus adaptor may be operable with a given set of proprietary remote function controller codes from among a plurality of different sets of proprietary remote function controller codes.

U.S. Pat. No. 7,305,293 to Flick discloses a vehicle tracking unit including a vehicle position determining device, a wireless communications device, and a controller connected to the wireless communications device and the vehicle position determining device. The controller cooperates with the wireless communications device to generate alert message notifications for the user. The alert message notifications may comprise an unauthorized remote transmitter alert message notification.

Despite the existence of such configurations, further developments may be desirable for dealing with rogue learned new remote transmitters.

SUMMARY

Generally, a control system is for a vehicle comprising a plurality of vehicle devices, and a data communications bus extending through the vehicle and coupled to the plurality of vehicle devices. The control system may include a vehicle wireless device, and a vehicle controller configured to communicate, via the data communications bus, with at least one vehicle device from among the plurality thereof based upon an authorized wireless control device, and send a request for authorization, via the vehicle wireless device, of a new wireless control device to be able to operate the vehicle controller. The control system may include a remote wireless device away from the vehicle and configured to receive the request for authorization from the vehicle controller, present the request for authorization to a user, and permit the user to send a response to the request for authorization to the vehicle controller.

In some embodiments, the vehicle controller may be configured to authorize the new wireless control device after expiration of a set time period. The vehicle controller may be switchable between armed and disarmed states responsive to the new wireless control device upon authorization thereof. For example, the at least one vehicle device may include at least one vehicle security device. The vehicle controller may also be switchable between vehicle locked and vehicle unlocked states responsive to the new wireless control device upon authorization thereof. The at least one vehicle device may comprise at least one vehicle door lock actuator, for example.

In some embodiments, the vehicle controller may be operable to start a vehicle engine responsive to the new wireless control device upon authorization thereof. For example, the at least one vehicle device may include at least one vehicle engine starting device. In some embodiments, the vehicle controller may be operable to enable an electric vehicle drive system responsive to the new wireless control device upon authorization thereof. Also, the vehicle controller may be operable to retrieve vehicle diagnostic data responsive to the new wireless control device upon authorization thereof. Also, for example, the at least one vehicle device may include at least one vehicle diagnostic device.

Moreover, the control system may comprise a vehicle position determining device. The vehicle controller may be configured to cooperate with the vehicle position determining device and the vehicle wireless device to send vehicle position data to the remote wireless device upon authorization of the new wireless control device. The vehicle controller may be configured to send the request for authorization with associated vehicle position data.

In some embodiments, the vehicle controller may be configured to be operable from the new wireless control device during a pre-authorization time period prior to receiving the response from the remote wireless device. The vehicle controller may be configured to permit selection of the pre-authorization time period. The vehicle controller may be configured to send the request for authorization with time stamp data associated therewith. For example, the remote wireless device may include a cellular telephone, and the vehicle wireless device may comprise at least one of a cellular transceiver, a Bluetooth transceiver, and a WiFi transceiver.

Another aspect is directed to a vehicle controller in a control system for a vehicle comprising a plurality of vehicle devices and a data communications bus extending through the vehicle and coupled to the plurality of vehicle devices. The control system may include a remote wireless device away from the vehicle. The vehicle controller may comprise a processor and memory cooperating therewith and configured to communicate, via the data communications bus, with at least one vehicle device from among the plurality thereof based upon an authorized wireless control device, and send a request for authorization, via a vehicle wireless device in the vehicle, of a new wireless control device to be able to operate the vehicle controller. The remote wireless device may be configured to receive the request for authorization from the vehicle controller, present the request for authorization to a user, and permit the user to send a response to the request for authorization to the vehicle controller.

Yet another aspect is directed to a method for operating a vehicle controller for a vehicle comprising a plurality of vehicle devices and a data communications bus extending through the vehicle and coupled to the plurality of vehicle devices. The method may include operating the vehicle controller to communicate, via the data communications bus, with at least one vehicle device from among the plurality thereof based upon an authorized wireless control device, and send a request for authorization, via a vehicle wireless device in the vehicle, of a new wireless control device to be able to operate the vehicle controller so that a remote wireless device is operable to receive the request for authorization from the vehicle controller. The remote wireless device is operable to present the request for authorization to a user, and permit the user to send a response to the request for authorization to the vehicle controller.

DETAILED DESCRIPTION

Figure 1:
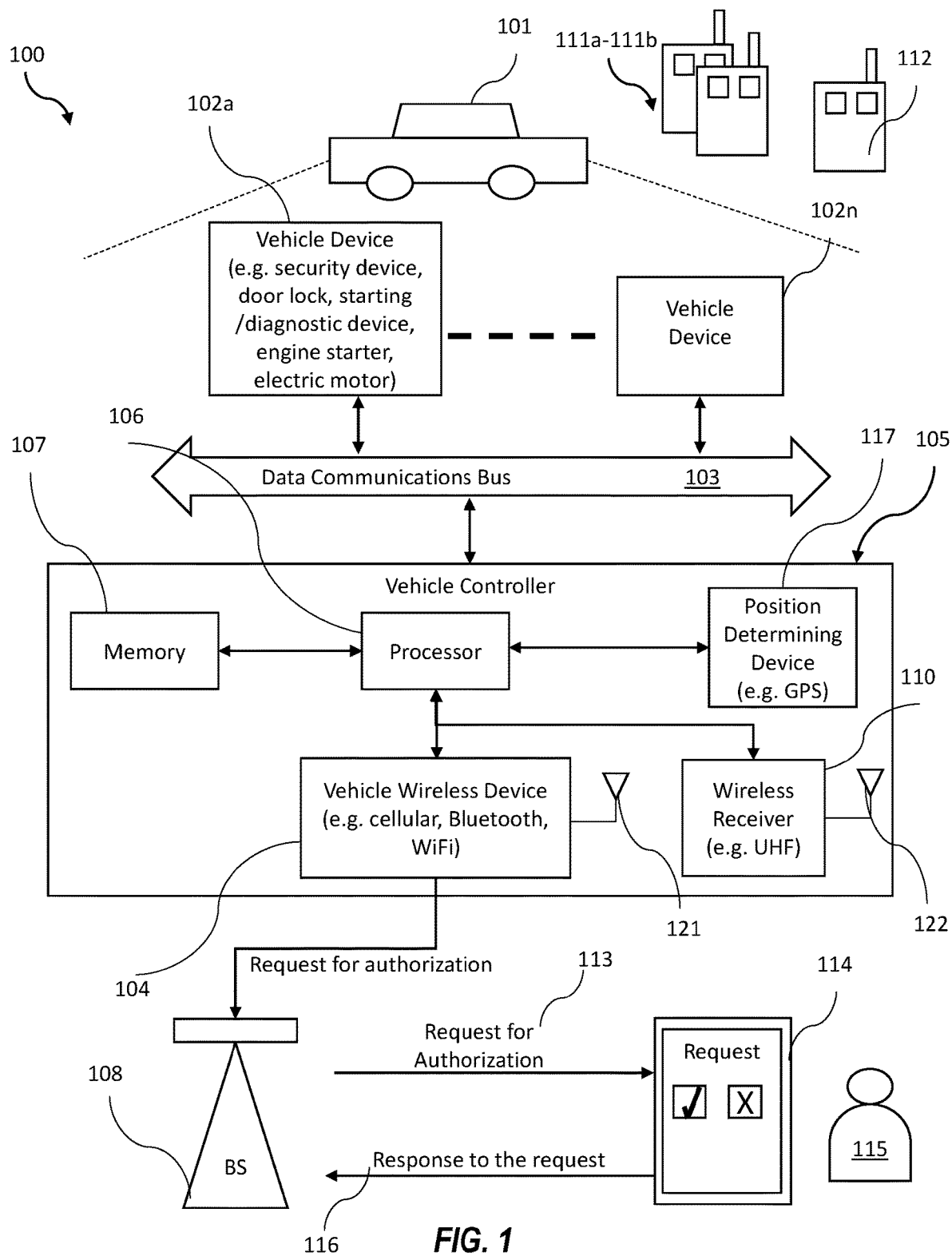
FIG. 1 is a schematic diagram of an example embodiment of a control system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Referring initially to FIGS. 1 & 2A-2D, a control system 100 according to the present disclosure is now described. The control system 100 is for a vehicle 101, for example, the illustrated motor vehicle. The control system 100 illustratively comprises a plurality of vehicle devices 102a-102n carried by the vehicle 101, and a data communications bus 103 extending through the vehicle and coupled to the plurality of vehicle devices.

The control system 100 comprises a vehicle controller 105 comprising a processor 106 and memory 107 cooperating therewith. The vehicle controller 105 illustratively comprises a vehicle wireless device 104 coupled to the processor 106, and a first antenna 121 coupled to the vehicle wireless device. For example, the vehicle wireless device 104 may comprise at least one of a cellular transceiver, a Bluetooth transceiver, a ZigBee transceiver, a WiMAX transceiver, and a WiFi transceiver. The vehicle controller 105 may also include an interface (e.g. a wireless interface or a wired plug-in interface), not shown, configured to receive software updates. For example, the multi-vehicle features of U.S. Pat. No. 8,032,278 to Flick, which is assigned to the present application's assignee and incorporated by reference in its entirety, may be added via the interface. The control system 100 illustratively cooperates with a wireless base station 108 in communication with the vehicle wireless device 104.

The vehicle controller 105 is configured to communicate, via the data communications bus 103, with one or more of the plurality of vehicle devices 102a-102n carried by the vehicle 101 based upon an authorized wireless control device. The plurality of vehicle devices 102a-102n may comprise one or more of a vehicle security device (e.g. alarm indicator), a vehicle door lock actuator, a vehicle engine starting device, an electric motor controller coupled to a drivetrain of the vehicle 101, a vehicle diagnostic device, a vehicle control module (VCM), and a vehicle body control module (BCM).

The vehicle controller 105 illustratively comprises a wireless receiver 110 coupled to the processor 106, and a second antenna 122 coupled to the wireless receiver. The wireless receiver 110 may comprise an ultra high frequency (UHF) receiver, for example. In some embodiments, the wireless receiver 110 may comprise a wireless transceiver. The control system 100 illustratively comprises a plurality of wireless control devices 111a-111b (i.e. the authorized wireless control devices), such as in the form of a key fob, for example, in communication with the wireless receiver 110.

In applications where the wireless receiver 110 comprises a wireless transceiver, the wireless control device 111a-111b may comprise a wireless transponder car key (e.g. in some applications, providing keyless entry and starting of the vehicle 101), or a wireless key card. As will be appreciated, the wireless key card may comprise an RFID card responsive to transmissions from the wireless transceiver 110 in the vehicle 101.

As will be appreciated, each of the plurality of wireless control devices 111a-111b is paired/authorized/learned with the vehicle 101, and is configured to perform a plurality of functions. The plurality of functions may comprise switching the vehicle controller 105 between armed and disarmed states for security, switching the vehicle controller between vehicle locked and vehicle unlocked states, placing the vehicle controller in a panic mode, retrieving diagnostic data from the vehicle 101, retrieving location data from the vehicle, starting the engine of the vehicle (i.e. internal combustion engine drive vehicles), and starting a vehicle drive system (i.e. electric drive vehicles).

Generally, the wireless control devices 111a-111b are provided upon purchase of the vehicle 101. When a new wireless control device 112 is subsequently needed, this is usually performed during maintenance. Because of the access granted to the new wireless control device 112, the creation of rogue unauthorized wireless control devices may present a security risk to the owner of the vehicle 101. In addition, when the vehicle 101 is left unattended, the learning of the new wireless control device 112 may be performed without notice to the owner.

The vehicle controller 105 is configured to determine when the new wireless control device 112 is to be learned.

In some embodiments, the vehicle controller 105 is also configured to be placed in a learning mode. When the new wireless control device 112 is detected and when the vehicle controller 105 has been placed in the learning mode, the vehicle controller 105 is configured to send a request for authorization 113, via the vehicle wireless device 104, of the new wireless control device 112 to be able to operate the vehicle controller. The vehicle controller 105 is configured to send the request for authorization 113 with time stamp data associated therewith, for example.

The control system 100 includes a remote wireless device 114 and a user 115 associated therewith, one or both being remote (i.e. geographically remote) to the vehicle 101. For drawing simplicity, only one vehicle 101 and user 115 are illustrated. Nevertheless, it should be appreciated that the control system 100 may include a plurality of vehicles and respective users. Moreover, it should be appreciated that each user 115 may comprise an individual owner of the vehicle 101. Of course, the user 115 may comprise an entity owner, for example, a car fleet owner, such as a rental car company, and the control system 100 may include a plurality of vehicles and respective vehicle controllers for monitoring the addition of the new wireless control device 112 for the plurality of vehicles. In these applications, the remote wireless device 114 potentially would receive the request for authorization 113 from one or more of the plurality of vehicles under monitoring. In some embodiments, the user 115 may comprise a monitoring service, and the monitoring service (e.g. a security company or an insurance company) may contact the owner of the vehicle 101, i.e. indirect reporting of the request for authorization 113.

The remote wireless device 114 is in communication with the wireless base station 108. For example, the remote wireless device 114 may include a cellular telephone, a tablet computing device, a personal computing device, or a wearable computing device. The remote wireless device 114 is configured to receive the request for authorization 113 from the vehicle controller 105. The remote wireless device 114 is also configured to present the request for authorization 113 to the user 115, and permit the user to send a response 116 to the request for authorization to the vehicle controller 105.

If the response 116 to the request for authorization 113 is approved, the new wireless control device 112 is authorized and added. If the response 116 to the request for authorization 113 is disapproved, the new wireless control device 112 is unauthorized and deleted. Advantageously, if the rogue unauthorized wireless control device is attempted to be learned (authorized), the user 115 is made aware of the issue, and can prevent the authorization of the new wireless control device 112.

Figure 2A:
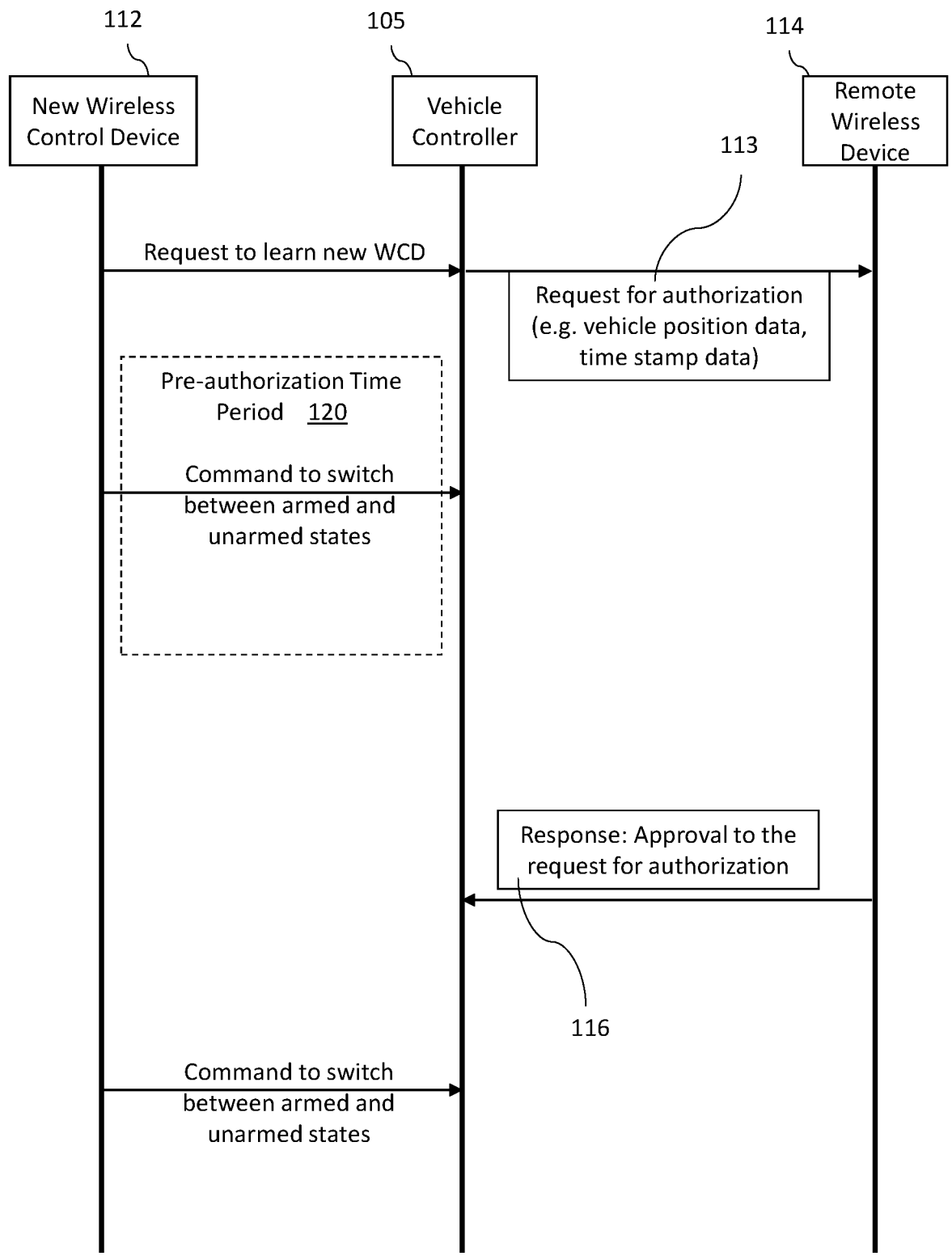
FIGS. 2A-2D are communication diagrams for the control system of FIG. 1.
Figure 2B:
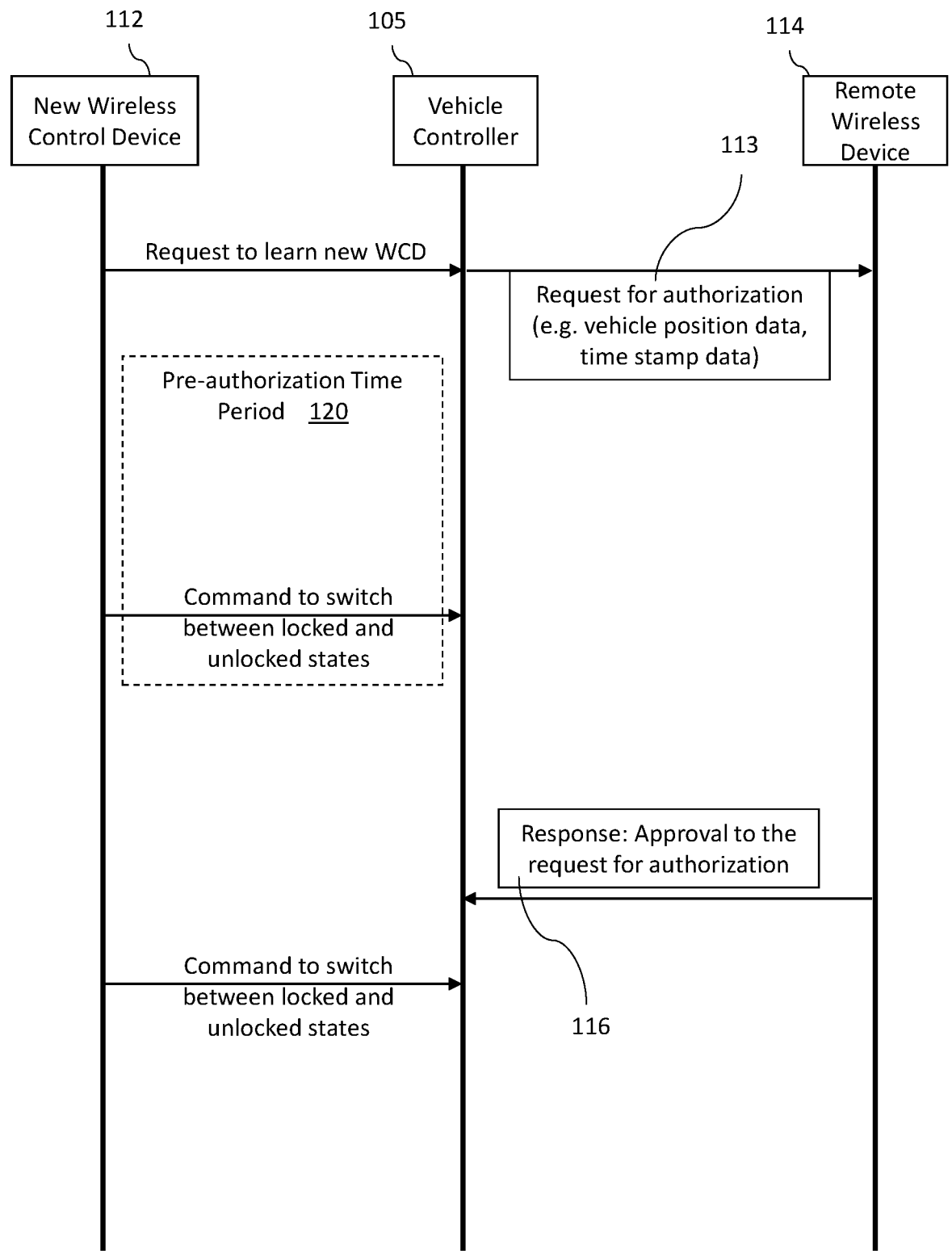
Figure 2C:
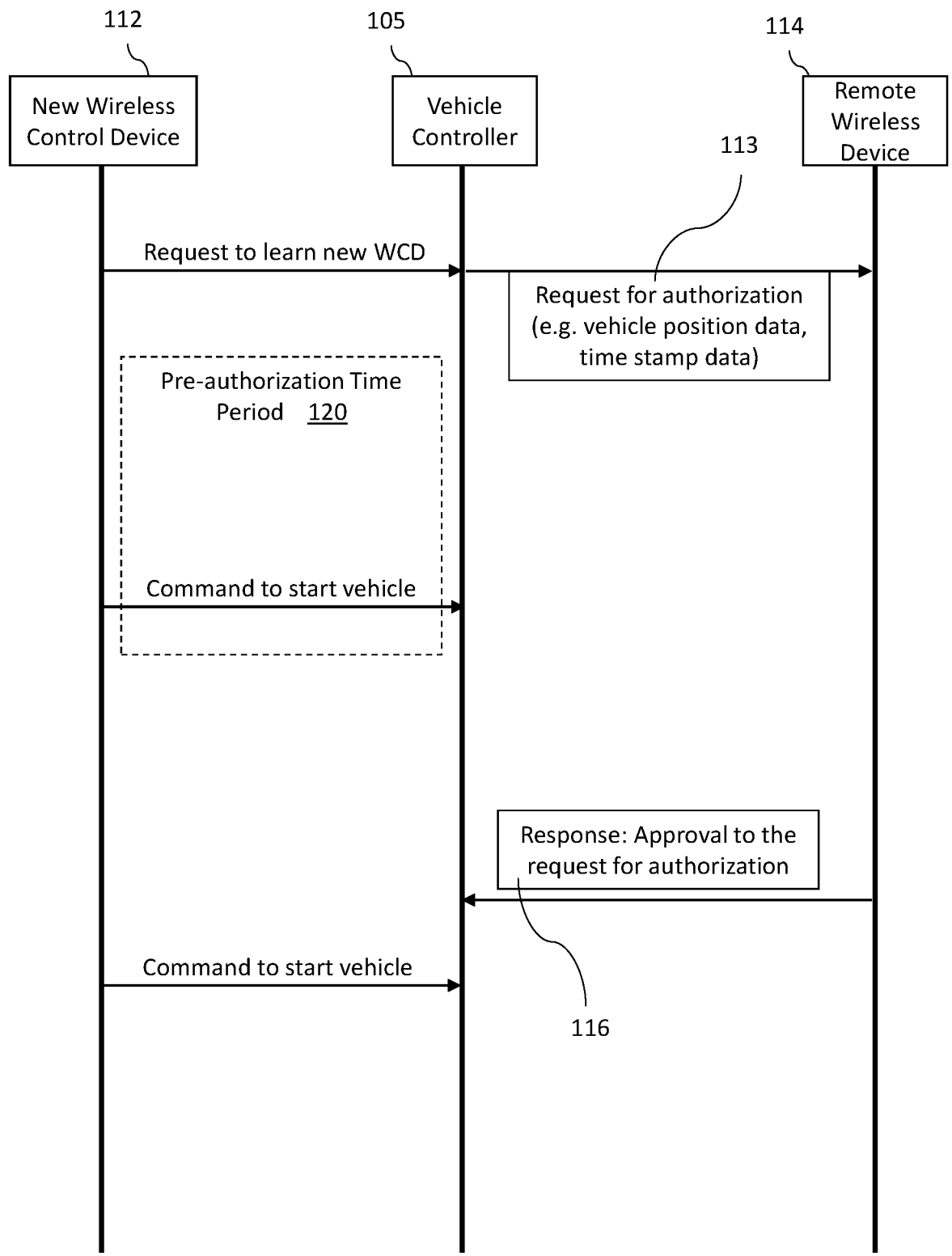
Figure 2D:
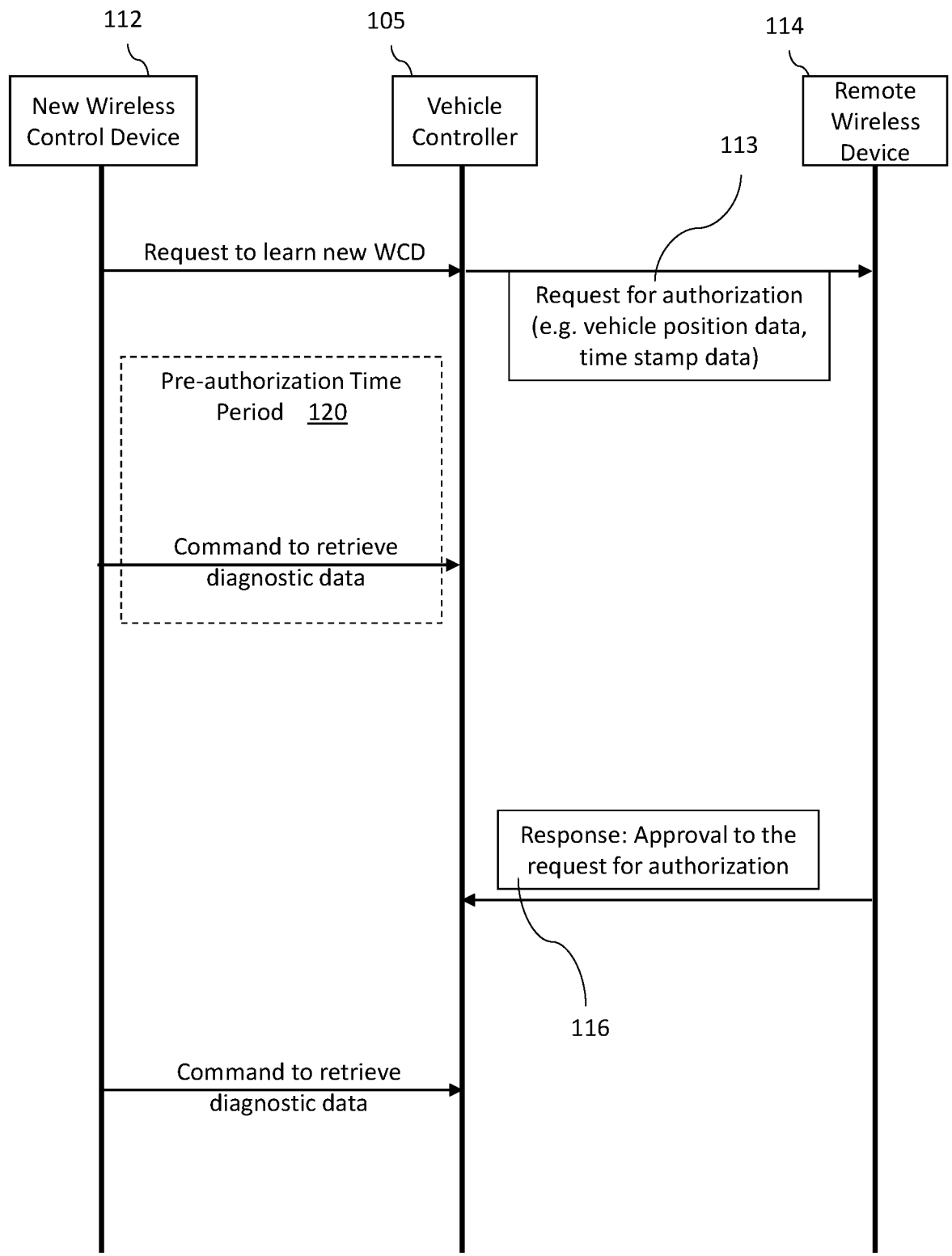

Once the new wireless control device 112 is authorized, the new wireless control device 112 has access to the plurality of functions of the vehicle 101. In particular, as shown in FIG. 2A, the vehicle controller 105 is configured to be switchable between armed and disarmed states responsive to the new wireless control device 112 upon authorization thereof. As shown in FIG. 2B, the vehicle controller 105 is configured to be switchable between vehicle locked and vehicle unlocked states responsive to the new wireless control device 112 upon authorization thereof. As shown in FIG. 2C, the vehicle controller 105 is operable to start a vehicle responsive to the new wireless control device 112 upon authorization thereof. In particular, depending on the drive type of the vehicle 101, the new wireless control device 112 is either controlling a vehicle engine starting device or a vehicle drive system controller. For example, for electric vehicles, the vehicle controller 105 is operable to enable an electric vehicle drive system responsive to the new wireless control device upon authorization thereof. Also, as shown in FIG. 2D, the vehicle controller 105 is operable to retrieve vehicle diagnostic data responsive to the new wireless control device 112 upon authorization thereof. It should be appreciated that one or more of the above noted functions can be implemented for the now authorized the new wireless control device 112.

In the illustrated embodiment, the vehicle controller 105 comprises a vehicle position determining device 117 (e.g. a global positioning system (GPS) device). The processor 106 is configured to cooperate with the vehicle position determining device 117 and the wireless receiver 110 to send vehicle position data to the remote wireless device 114 upon authorization of the new wireless control device 112. Also, the vehicle controller 105 is configured to send the request for authorization 113 with associated vehicle position data. This provides another level of security verification for the user 115. For example, if the new wireless control device 112 is being added by the dealer, the vehicle position data would show the vehicle 101 is located at the dealer.

In some embodiments, the vehicle controller 105 is configured to be operable from the new wireless control device 112 during an optional pre-authorization time period 120 prior to receiving the response 116 from the remote wireless device 114. Of course, the pre-authorization time period 120 is optional, and may be omitted in some embodiments, or simply disabled by the user 115. In other words, once the new wireless control device 112 is detected as to be added or to be learned, it is operational for a limited time period and before the response 116 to the request for authorization 113 is received. As shown in FIGS. 2A-2D, the new wireless control device 112 is able to send commands to the vehicle controller while in the optional pre-authorization time period 120. The vehicle controller 105 is configured to permit selection of the pre-authorization time period 120. In some embodiments, the user interface of the remote wireless device 114 includes an option to set the pre-authorization time period 120.

In the illustrated embodiment, the vehicle wireless device 104, the vehicle position determining device 117, and the wireless receiver 110 share a common housing with the processor 106 and memory 107 within the vehicle controller 105 and communicate with each other internally without using the data communications bus 103 of the vehicle 101. For example, the illustrated embodiment may be helpful for retrofit applications. In other embodiments, one or more of the vehicle wireless device 104, the vehicle position determining device 117, and the wireless receiver 110 may be housed separately and coupled to the data communications bus 103, for example. In these embodiments, the vehicle controller 105 would use the data communications bus 103 to communicate with the vehicle wireless device 104, the vehicle position determining device 117, and/or the wireless receiver 110.

In some embodiments, the vehicle controller 105 is configured to authorize the new wireless control device after expiration of a set time period (i.e. a timeout period for the request). In particular, if the user 115 does not send the response 116 to the request for authorization 113 before the expiration of the set time period, the request for authorization 113 is automatically approved and the new wireless control device 112 is learned.

Another aspect is directed to a vehicle controller 105 in a control system 100 for a vehicle 101 comprising a plurality of vehicle devices 102a-102n, and a data communications bus 103 extending through the vehicle and coupled to the plurality of vehicle devices. The control system 100 includes a remote wireless device 114 away from the vehicle 101. The vehicle controller 105 comprises a processor 106 and memory 107 cooperating therewith and configured to communicate, via the data communications bus 103, with at least one vehicle device from among the plurality 102a-102n thereof based upon an authorized wireless control device, and send a request for authorization 113, via a vehicle wireless device 104 in the vehicle 101, of a new wireless control device 112 to be able to operate the vehicle controller. The remote wireless device 114 is configured to receive the request for authorization 113 from the vehicle controller 105, present the request for authorization to a user 115, and permit the user to send a response 116 to the request for authorization to the vehicle controller 105.

Yet another aspect is directed to a method for operating a vehicle controller 105 for a vehicle 101 comprising a plurality of vehicle devices 102a-202n and a data communications bus 103 extending through the vehicle and coupled to the plurality of vehicle devices. The method includes operating the vehicle controller 105 to communicate, via the data communications bus 103, with at least one vehicle device 102a-102b from among the plurality thereof based upon an authorized wireless control device, and send a request for authorization 113, via a vehicle wireless device 104 in the vehicle 101, of a new wireless control device 112 to be able to operate the vehicle controller so that a remote wireless device is operable to receive the request for authorization from the vehicle controller. The remote wireless device 114 is operable to present the request for authorization 113 to a user 115, and permit the user to send a response 116 to the request for authorization to the vehicle controller 05.

Figure 3:
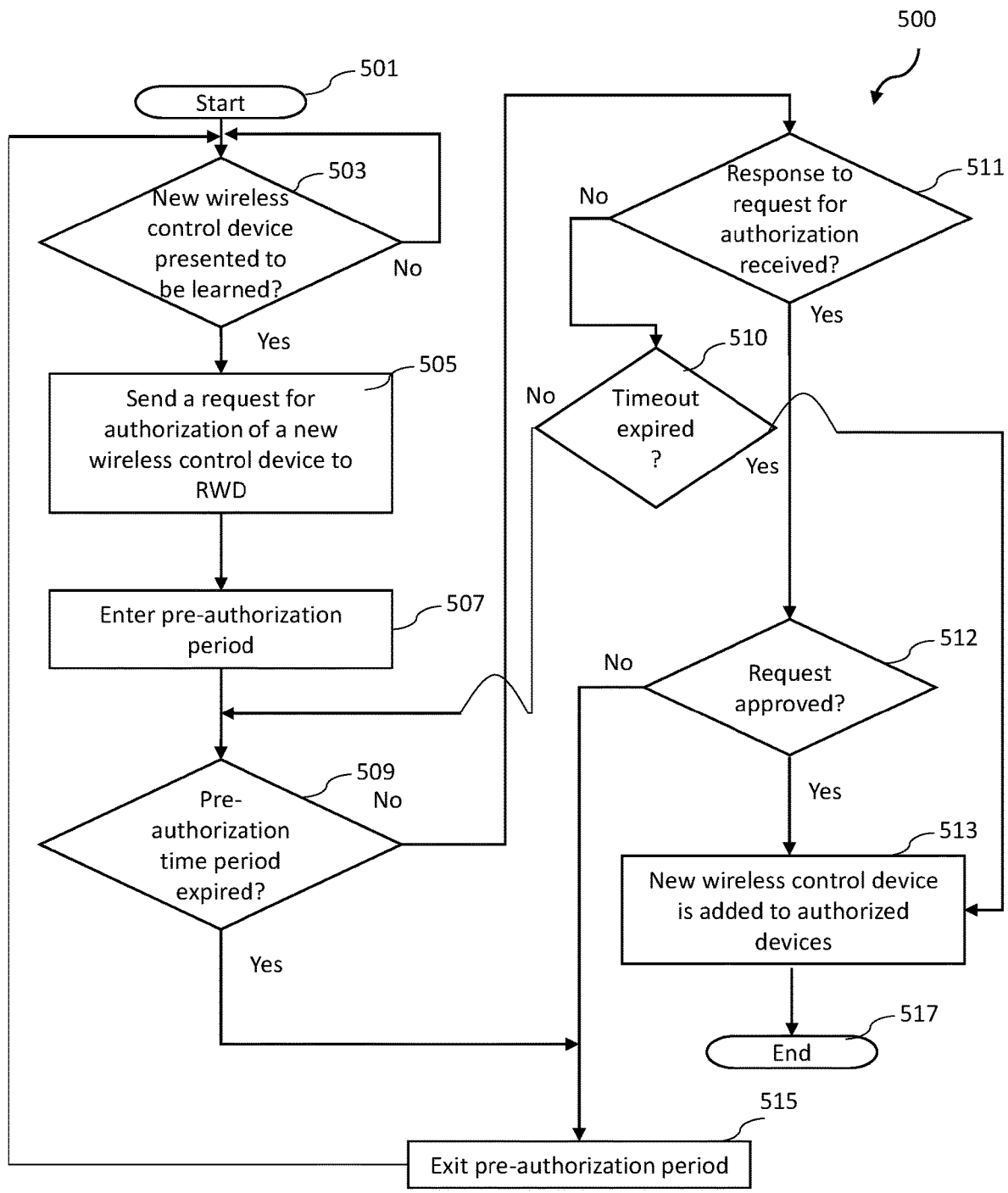
FIG. 3 is a flowchart for a method of operating the control system of FIG. 1.

Referring now additionally to FIG. 3, with reference to a flowchart 500, which begins at Block 501, a method for operating a control system 100 for a vehicle 101 is now described. The method includes determining when a new wireless control device 112 is to be learned at Block 503, and then sending a request for authorization 113, via a vehicle wireless device 104, of the new wireless control device 112 at Block 505. The method includes entering the pre-authorization time period 120 at Block 507, and monitoring its expiration at Block 509. In some embodiments, the pre-authorization time period 120 feature may be omitted (not shown). The method illustratively includes awaiting a response 116 to the request for authorization 113 at Block 511. If the response 116 to the request for authorization 113 has not been received, the method returns to Block 509 if the timeout period has not expired. (Block 510). If the timeout period has expired, the new wireless control device is authorized at Blocks 510 & 513. In some embodiments, the timeout period feature may be omitted (not shown).

At Block 512, if the response 116 to the request for authorization 113 is a negative, i.e. the request is not approved, the method includes exiting the pre-authorization time period 120 at Block 515 and returns to Block 501. At Block 512, if the response 116 to the request for authorization 113 is a positive, i.e. the request is approved, the method includes adding the new wireless control device 112 to the listing of authorized wireless control devices at Block 513 and ends at Block 517.

Other features for control systems for vehicles are disclosed in U.S. Pat. Nos. 5,654,688, 6,144,315, 6,509,868, and 7,305,293, all assigned to the present application's assignee, which are incorporated by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A control system for a vehicle comprising a plurality of vehicle devices and a data communications bus extending through the vehicle and coupled to the plurality of vehicle devices, the control system comprising:
   a vehicle wireless device in the vehicle;
   a vehicle controller in the vehicle configured to
      communicate, via the data communications bus, with at least one vehicle device from among the plurality thereof based upon an authorized wireless control device, and
      send a request for authorization, via the vehicle wireless device, of a new wireless control device to be authorized to operate the vehicle controller; and
   a remote wireless device away from the vehicle and configured to
      receive the request for authorization from the vehicle controller,
      present the request for authorization to a user, and
      permit the user to send a response to the request for authorization to the vehicle controller; the vehicle controller configured to
      subsequent to sending the request for authorization, enter a pre-authorization mode and be operable from the new wireless control device during a pre-authorization time period,
      when the pre-authorization time period expires, exit the pre-authorization mode, and
      when receiving the response from the remote wireless device, exit the pre-authorization mode.

2. The control system of claim 1 wherein the vehicle controller is configured to authorize the new wireless control device after expiration of a set time period.

3. The control system of claim 1 wherein the vehicle controller is switchable between armed and disarmed states responsive to the new wireless control device upon authorization thereof.

4. The control system of claim 3 wherein the at least one vehicle device comprises at least one vehicle security device.

5. The control system of claim 1 wherein the vehicle controller is switchable between vehicle locked and vehicle unlocked states responsive to the new wireless control device upon authorization thereof.

6. The control system of claim 5 wherein the at least one vehicle device comprises at least one vehicle door lock actuator.

7. The control system of claim 1 wherein the vehicle controller is operable to start a vehicle engine responsive to the new wireless control device upon authorization thereof.

8. The control system of claim 7 wherein the at least one vehicle device comprises at least one vehicle engine starting device.

9. The control system of claim 1 wherein the vehicle controller is operable to enable an electric vehicle drive system responsive to the new wireless control device upon authorization thereof.

10. The control system of claim 1 wherein the vehicle controller is operable to retrieve vehicle diagnostic data responsive to the new wireless control device upon authorization thereof.

11. The control system of claim 10 wherein the at least one vehicle device comprises at least one vehicle diagnostic device.

12. The control system of claim 1 comprising a vehicle position determining device; and wherein the vehicle controller is configured to cooperate with the vehicle position determining device and the vehicle wireless device to send vehicle position data to the remote wireless device upon authorization of the new wireless control device.

13. The control system of claim 12 wherein the vehicle controller is configured to send the request for authorization with associated vehicle position data.

14. The control system of claim 1 wherein the vehicle controller is configured to permit selection of the pre-authorization time period.

15. The control system of claim 1 wherein the vehicle controller is configured to send the request for authorization with time stamp data associated therewith.

16. The control system of claim 1 wherein the remote wireless device comprises a cellular telephone.

17. The control system of claim 1 wherein the vehicle wireless device comprises at least one of a cellular transceiver, a Bluetooth transceiver, and a WiFi transceiver.

18. A vehicle controller for a control system for a vehicle comprising a plurality of vehicle devices and a data communications bus extending through the vehicle and coupled to the plurality of vehicle devices, the control system comprising a remote wireless device remote from the vehicle, the vehicle controller comprising:
a processor and memory cooperating therewith, and configured to
communicate, via the data communications bus, with at least one vehicle device from among the plurality thereof based upon an authorized wireless control device,
send a request for authorization, via a vehicle wireless device in the vehicle, of a new wireless control device to be able to operate the vehicle controller so that the remote wireless device is operable to
receive the request for authorization from the vehicle controller,
present the request for authorization to a user, and
permit the user to send a response to the request for authorization to the vehicle controller,
subsequent to sending the request for authorization, enter a pre-authorization mode and be operable from the new wireless control device during a pre-authorization time period,
when the pre-authorization time period expires, exit the pre-authorization mode, and
when receiving the response from the remote wireless device, exit the pre-authorization mode.

19. The vehicle controller of claim 18 wherein the processor is configured to authorize the new wireless control device after expiration of a set time period.

20. The vehicle controller of claim 18 wherein the processor is switchable between armed and disarmed states responsive to the new wireless control device upon authorization thereof.

21. The vehicle controller of claim 18 wherein the processor is switchable between vehicle locked and vehicle unlocked states responsive to the new wireless control device upon authorization thereof.

22. The vehicle controller of claim 18 wherein the processor is operable to start a vehicle engine responsive to the new wireless control device upon authorization thereof.

23. The vehicle controller of claim 18 wherein the processor is operable to enable an electric vehicle drive system responsive to the new wireless control device upon authorization thereof.

24. The vehicle controller of claim 18 wherein the processor is operable to retrieve vehicle diagnostic data responsive to the new wireless control device upon authorization thereof.

25. The vehicle controller of claim 18 wherein the processor is configured to cooperate with a vehicle position determining device in the vehicle and the vehicle wireless device to send vehicle position data to the remote wireless device upon authorization of the new wireless control device.

26. A method for operating a vehicle controller for a vehicle comprising a plurality of vehicle devices and a data communications bus extending through the vehicle and coupled to the plurality of vehicle devices, the method comprising:
operating the vehicle controller in the vehicle to
communicate, via the data communications bus, with at least one vehicle device from among the plurality thereof based upon an authorized wireless control device, and
send a request for authorization, via a vehicle wireless device in the vehicle, of a new wireless control device to be able to operate the vehicle controller so that a remote wireless device is operable to
receive the request for authorization from the vehicle controller,
present the request for authorization to a user, and
permit the user to send a response to the request for authorization to the vehicle controller; and
operating the vehicle controller to
subsequent to sending the request for authorization, enter a pre-authorization mode and be operable from the new wireless control device during a pre-authorization time period,
when the pre-authorization time period expires, exit the pre-authorization mode, and
when receiving the response from the remote wireless device, exit the pre-authorization mode.

27. The method of claim 26 comprising operating the vehicle controller to authorize the request for authorization after expiration of a set time period.

28. The method of claim 26 comprising switching the vehicle controller between armed and disarmed states responsive to the new wireless control device upon authorization thereof.

29. The method of claim 26 comprising switching the vehicle controller between vehicle locked and vehicle unlocked states responsive to the new wireless control device upon authorization thereof.

30. The method of claim 26 comprising operating the vehicle controller to start a vehicle engine responsive to the new wireless control device upon authorization thereof.

31. The method of claim 26 comprising operating the vehicle controller to enable an electric vehicle drive system responsive to the new wireless control device upon authorization thereof.

32. The method of claim 26 comprising operating the vehicle controller to retrieve vehicle diagnostic data responsive to the new wireless control device upon authorization thereof.

33. The method of claim 26 comprising operating the vehicle controller to cooperate with a vehicle position determining device and the vehicle wireless device to send vehicle position data to the remote wireless device upon authorization of the new wireless control device.

* * * * *